E. MATTMAN.
TURBO CONSTRUCTION.
APPLICATION FILED DEC. 21, 1908.
1,030,595.
Patented June 25, 1912.
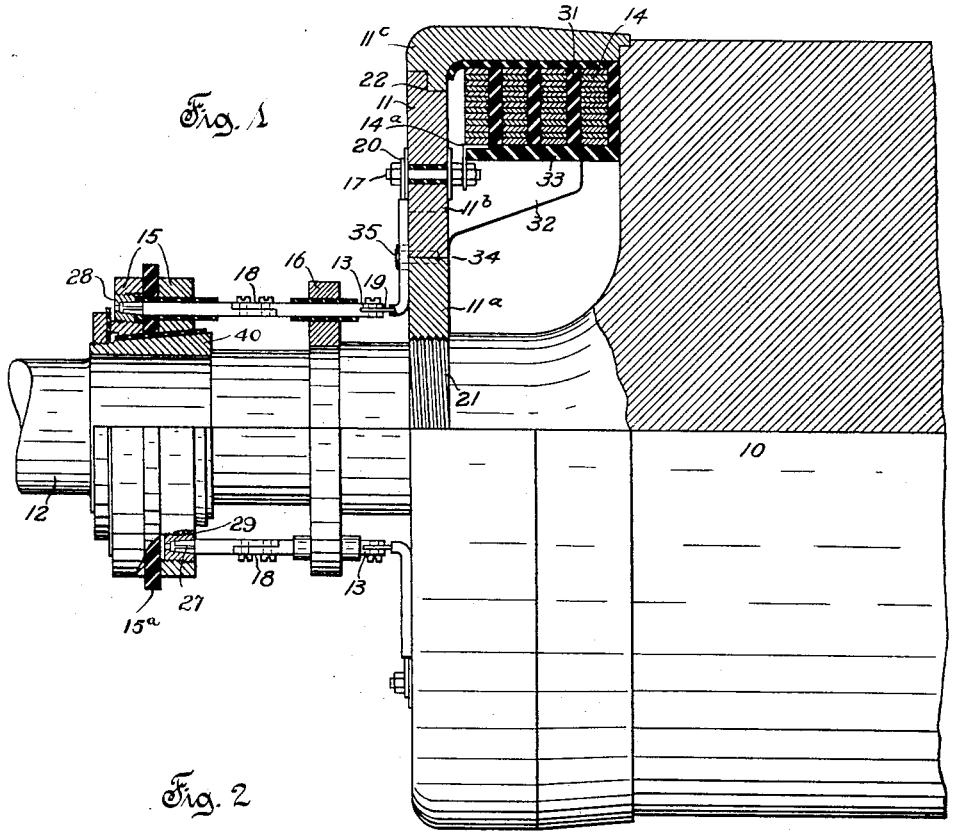
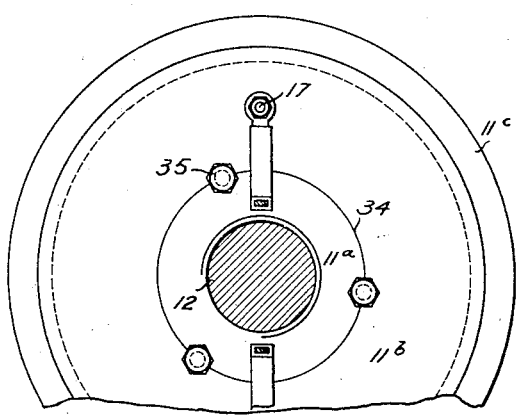
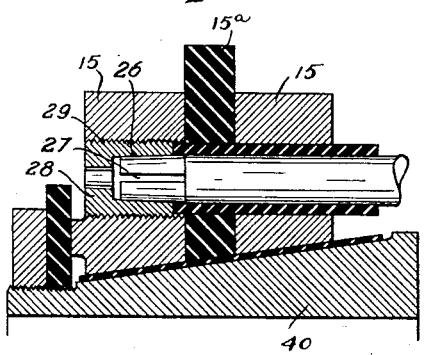
Witnesses
Rob. E. Stoll.
Chas. L. Byron
Inventor
Emil Mattman
By Chas. E. Lord
Attorney

UNITED STATES PATENT OFFICE.

EMIL MATTMAN, OF MILWAUKEE, WISCONSIN, ASSIGNOR TO ALLIS-CHALMERS COMPANY, A CORPORATION OF NEW JERSEY.

TURBO CONSTRUCTION.

1,030,595.  Specification of Letters Patent.  Patented June 25, 1912.

Application filed December 21, 1908. Serial No. 468,626.

*To all whom it may concern:*

Be it known that I, EMIL MATTMAN, a citizen of Switzerland, residing at Milwaukee, in the county of Milwaukee and State of Wisconsin, have invented certain new and useful Improvements in Turbo Constructions, of which the following is a full, clear, and exact specification.

My invention relates to dynamo-electric machines, and more particularly to the construction of rotors for turbo generators.

One of the objects of my invention is to provide an improved coil retaining and protecting end cover for a turbo generator rotor so constructed as to permit the removal of the cover or parts thereof without removing the collector rings when the machine is assembled.

Another object of my invention is to provide novel collector leads connecting the rotor winding and the collector rings, said leads being divided at convenient places, to permit the removal of the collector rings, and supporting members hereinafter to be referred to, without disturbing the rotor winding.

A further object is to provide a more suitable and effective connection, both electrical and mechanical between the collector rings and the collector leads.

The various novel features of my invention will be described in the specification and particularly set forth in the appended claims.

In the accompanying sheet of drawings, Figure 1 is a front elevation, partly in section of the rotor of a dynamo-electric machine equipped with my invention; Fig. 2 is a fragmentary elevation of the end cover showing the arrangement of the parts thereof; and, Fig. 3 is an enlarged sectional view of a connection between the collector leads and collector rings shown in Fig. 1.

I have shown in Fig. 1 a rotary member, or rotor, which is the field member of this turbo generator. This rotor includes the core 10, field winding 14, and coil retaining and protecting end cover 11, the core being mounted on a shaft 12. Collector leads or conductors 13 connect the field winding 14 with collector rings 15. The leads are retained in position intermediate their ends and prevented from being displaced at high speeds by an annular collar 16 around the shaft and by bolts 17, the latter being insulated from the cover 11 and serving both for electrical and mechanical purposes. As is shown in Fig. 1, the conductors are divided into a plurality of parts, the said parts being connected as indicated at 18, 19, and 20. The collector rings 15 are on the same end of the shaft and seated on a sleeve 40 having an inclined surface, said sleeve being secured to the shaft in any suitable manner.

The coil retaining and protecting end cover 11 comprises three annular parts $11^a$, $11^b$, and $11^c$, the innermost part $11^a$ engaging a threaded portion 21 of the shaft. The middle part $11^b$ of the end cover has an inside diameter sufficiently large to permit its removal over the collector rings without disturbing said rings in any way. The middle part is also provided with a shoulder or integral flange on the outside edge fitting the corresponding depression in the outside portion $11^c$ of the end cover. The inside and middle sections match as indicated at 34, and are held together by bolts, as shown at 35. In this way the parts $11^a$, $11^b$, and $11^c$ of the end cover are held firmly together. The end cover proper 11 is fastened to the shaft and core in the usual manner.

Novel means for connecting the leads and collector rings is illustrated in Figs. 1 and 3. The collector rings and insulation $15^a$ between them are provided with apertures into which a lead is placed. One of the leads is insulated from the first collector ring and makes electrical contact with the second. The collector leads are slightly tapered, as shown at 26 and slotted as shown at 27 rendering the ends of said leads resilient. There can be as many slots as desired or needed; in this case, two diametrical slots at right angles to each other have been used. A plug 28 engaging a threaded portion 29 of the collector ring is provided with a tapered recess for the reception of the tapered end of a collector lead, and a square, hexagonal or other shaped slot for the use of a wrench. The plug is screwed into the collector ring, and the tapered end of the connector is forced into the tapered recess of the plug 28 springing the integral projections formed by the slots, radially inward making a tight and secure connection. The degree of tightness depends upon the length of the collector lead held by the plug 28.

Suitable insulation 31 is placed between the end turns of the field winding 14. It is necessary to support or brace this insulation in some manner, especially when the machine is at rest. When the machine is in motion the insulation has a tendency to fly outwardly due to the action of centrifugal force, but the portion 11$^c$ of the end cover 11 renders this displacement impossible. When the rotor is stationary, displacement of the insulation has been guarded against by the use of braces 32. Between the braces 32 and the projecting end turns of the field winding there is more insulation 33 which extends from the end cover 11 to the core 10 and is supported by the said braces. The braces may be formed integrally with the portion 11$^b$ of the end cover or may be fastened securely thereto by bolts.

Many modifications may be made in the precise arrangement here shown and described, and all such which do not involve a departure from the spirit and scope of my invention, I aim to cover in the following claims.

What I claim as new is:

1. In a dynamo-electric machine, the combination of collector rings, insulation separating said rings, and a collector lead having a resilient end and a plurality of horizontally alined sections separably connected, said collector rings and said insulation being provided with apertures, said lead passing into one of said apertures and insulated from one of said collector rings, the resilient end of said lead being screw-connected to the other collector ring.

2. In combination, in a dynamo-electric machine, two collector rings, insulation between said rings, said rings and insulation provided with apertures, a lead passing into one of said apertures and insulated from one of said rings, the end of said lead being tapered and slotted, and a clamping plug having a threaded portion engaging one of said collector rings and a recessed portion receiving the tapered-slotted portion of said lead, said lead being tightly clamped in position by said plug.

3. In combination, in the rotor of a dynamo-electric machine, a core, coils having projecting end turns and carried by said core, a coil retaining and protecting end cover for said projecting end turns, a collector ring, and a connection between said coils and ring, said end cover comprising a plurality of separable parts some of which can be removed over said ring without disturbing the latter.

4. In a dynamo-electric machine, the combination of a collector ring provided with a tapped aperture, a screw threaded plug in said aperture, and a collector lead provided with a tapered slotted end, said plug being provided with a tapered recess which receives the tapered slotted lead and in which said lead is clamped by a longitudinal movement of said plug in said aperture.

5. In a dynamo-electric machine, the combination of a winding, a collector ring having a tapped aperture, a hollow plug secured in said tapped aperture, and a collector lead connecting said winding and said collector ring, said lead having a resilient end portion adapted to be secured in the hollow portion of said plug.

Milwaukee, Wis., Dec. 9, 1908.

In testimony whereof I affix my signature in the presence of two witnesses.

EMIL MATTMAN.

Witnesses:
H. C. CASE,
CHAS. L. BYRON.

Copies of this patent may be obtained for five cents each, by addressing the "Commissioner of Patents. Washington, D. C."